(12) United States Patent
Stone et al.

(10) Patent No.: US 7,837,175 B2
(45) Date of Patent: Nov. 23, 2010

(54) VARIABLE TORQUE VALVE ACTUATOR

(75) Inventors: Kenneth A. Stone, Smithfield, VA (US); Robert Kaminsky, Yorktown, VA (US); Todd R. MacLay, Yorktown, VA (US)

(73) Assignee: Newport News Shipbuilding and Dry Dock Company, Newport News, VA (US)

( * ) Notice: Subject to any disclaimer, the term of this patent is extended or adjusted under 35 U.S.C. 154(b) by 824 days.

(21) Appl. No.: 11/766,154

(22) Filed: Jun. 21, 2007

(65) Prior Publication Data
US 2008/0315139 A1 Dec. 25, 2008

(51) Int. Cl.
*F16K 31/44* (2006.01)
(52) U.S. Cl. .............................. 251/249; 74/508; 74/509
(58) Field of Classification Search ................. 251/248, 251/249; 74/508, 424.71, 670, 509
See application file for complete search history.

(56) References Cited
U.S. PATENT DOCUMENTS

| | | | |
|---|---|---|---|
| 326,196 A | 9/1885 | Blessing | |
| 783,007 A | 2/1905 | Allen et al. | |
| 1,784,094 A | 12/1930 | Fletcher | |
| 1,793,228 A | 2/1931 | Hackethal | |
| 1,996,365 A | 4/1935 | Clinedinst | |
| 2,025,244 A | 12/1935 | Morehead et al. | |
| 2,150,813 A | 3/1939 | Ball | |
| 2,674,903 A | 4/1954 | Doster | |
| 3,108,487 A | 10/1963 | Sandler | |
| 4,082,247 A | 4/1978 | Dalton | |
| 4,093,180 A | 6/1978 | Strabala | |
| 4,994,001 A | 2/1991 | Wilkinson et al. | |

*Primary Examiner*—John Rivell
*Assistant Examiner*—Andrew J Rost
(74) *Attorney, Agent, or Firm*—Alston & Bird LLP

(57) ABSTRACT

The invention provides an actuator for moving a threaded valve stem along a longitudinal axis to selectively open or close a valve. The actuator comprises a carrier rotatably mounted within a housing. A portion of the carrier has a bore threaded to receive the threaded valve stem. The actuator further comprises a gear arrangement configured for transmitting a rotational force to the carrier. A cylindrical operator rotatably mounted to the housing has a plurality of splines on its circumference and is configured for receiving a rotational input force from a drive mechanism. An annular collar slidably disposed around the operator rotates with the operator but can slide longitudinally along the operator between a first position in which it engages the gear arrangement and a second position in which it engages the carrier.

19 Claims, 3 Drawing Sheets

VARIABLE TORQUE VALVE ACTUATOR

BACKGROUND

Pipe installations employ valves to regulate fluid flow within the piping system. Valves can be hand operated or motor operated (MOV) or both; some valves can be pneumatically operated. Hand operated valves are opened and closed (stroked) by turning a handwheel coupled to a valve stem, which raises or lowers a disc to regulate fluid flow. Valve stems can be rising/non-rotating or non-rising/rotating and operate to stroke the valve in response to handwheel movement. Motor operated valves are stroked by operation of a motor coupled to the valve stem which operates (rotates or translates) in response to motor rotation. In either configuration, the handwheel or motor should be rotatable in both clockwise and counterclockwise directions to open or close the valve.

When pipes transport material, the load on the valve disc is a function of valve geometry and line pressure. The load determines the amount of force required to open and close the valve, which in turn determines the amount of torque required to engage the valve stem. The larger the fluid pressure inside a valve, the greater the torque required to stroke the valve.

To facilitate valve operation, traditional valve actuators employ a gear assembly to step down the input torque required to drive the valve stem. Such torque reducing gear assemblies find frequent use in applications where only manual operation via a handwheel is available, such as naval vessels where operational reliability is essential. In manual operation, the input force needed to provide the required torque to stroke the valve is determined by handwheel diameter. Handwheel diameter, however, can be constrained by the surrounding structure and machinery of the installation. Thus, gear assemblies are configured to accommodate the needed torque at a particular valve load given a specific handwheel.

The number of handwheel turns required to open or close a valve is determined by the gear ratio of the gear assembly. The greater the gear ratio, the lower the input force needed to impart a given torque, and the higher the number of handwheel turns needed to move the valve disc a given distance. Regardless of whether the load on the valve disc is low or high, though, the same number of turns are required to stroke the valve at a given gear ratio. While a large number of turns may be an acceptable trade-off when a heavy input torque is demanded, such a large number of turns car be inconvenient when the torque requirement is low because it requires a significant amount of time to stroke the valve.

Accordingly, there is a need for a valve actuator that can provide a variable gear ratio in response to different torque demands time constraints.

SUMMARY OF THE INVENTION

An exemplary aspect of the invention provides an actuator for moving a threaded valve stem along a longitudinal axis to selectively open or close a valve positioned at a distal end of the valve stem. The actuator comprises a housing and a carrier rotatably mounted within the housing for rotation of the carrier about the longitudinal axis. The carrier has a stem engagement portion having a bore formed therein, the bore being threaded to engage and receive the threaded valve stem therethrough. The carrier also has a first collar engagement portion, and a gear engagement portion. The actuator further comprises a gear arrangement comprising a central gear rotatably mounted within the housing for rotation about the longitudinal axis and having a second collar engagement portion. The gear arrangement engages the gear engagement portion of the carrier for transmitting a rotational force from the central gear to the carrier. A cylindrical operator is rotatably mounted to the housing for rotation about the longitudinal axis. The operator has a plurality of elongate, longitudinally oriented splines on at least a portion of a circumferential surface thereof and is configured for receiving a rotational input force from a drive mechanism. The actuator also comprises an annular collar slidably disposed around the operator. The collar has a cylindrical body with proximal and distal ends and a through bore having a bore surface configured to engage the splines so that the collar must rotate with the operator but can slide longitudinally along the operator between at least a first longitudinal position and a second longitudinal position. The collar also has a rotation transmission portion configured for engaging the second collar engagement portion to allow transmission of a rotational force to the central gear when the collar is in its first longitudinal position and for engaging the first collar engagement portion to allow transmission of a rotational force to the carrier when the collar is in its second longitudinal position.

BRIEF DESCRIPTION OF THE DRAWINGS

The accompanying figures depict certain illustrative embodiments and may aid in understanding the following detailed description. The embodiments depicted are to be understood as exemplary and in no way limiting of the overall scope of the invention. The detailed description will make reference to the following figures, in which.

Throughout the drawings, like reference numbers refer to like elements, features, and structures.

DETAILED DESCRIPTION OF PREFERRED EMBODIMENTS

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness.

Figure 1:
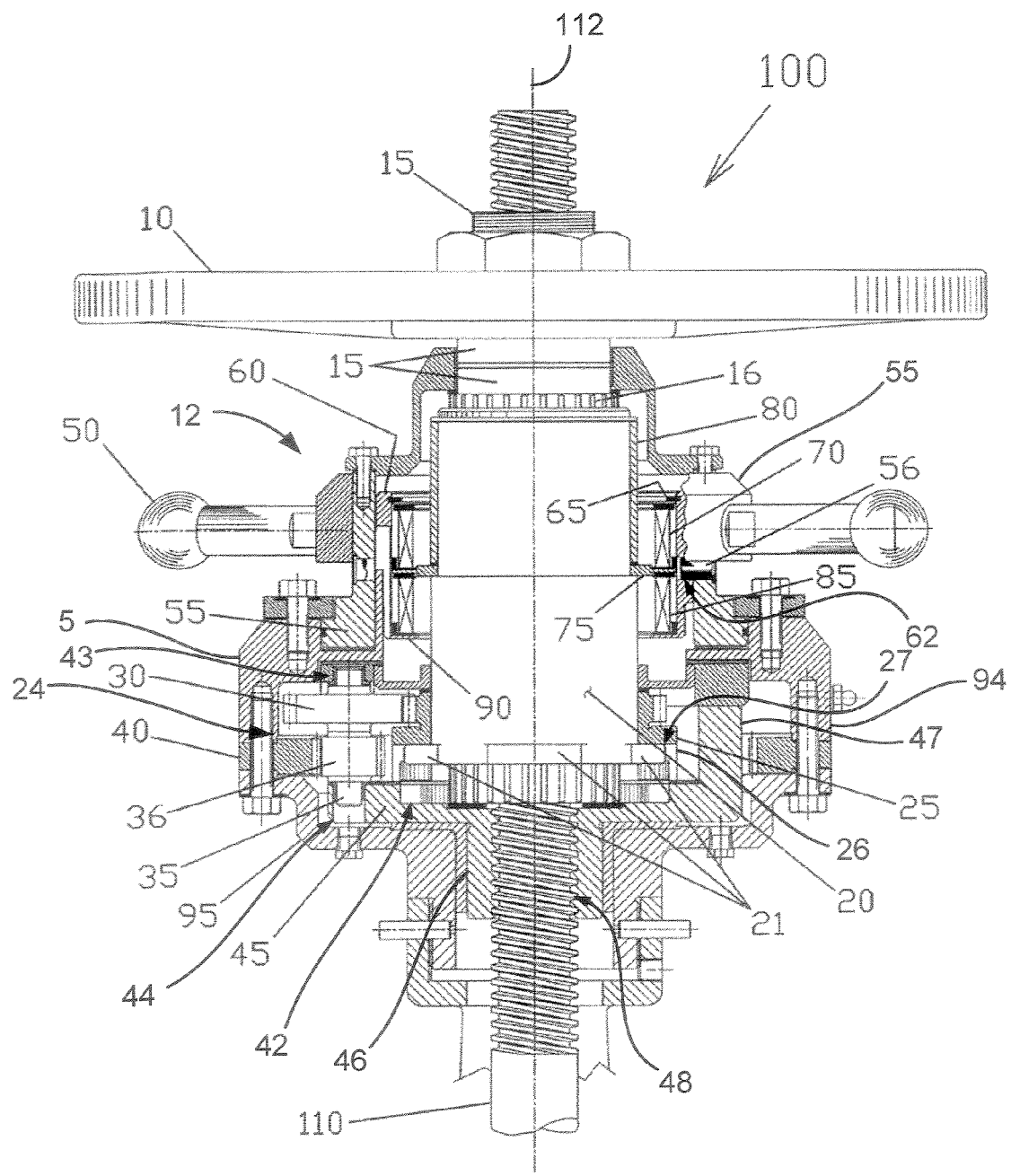
FIG. 1 illustrates a sectional view of the valve actuator in a first position in accordance with an exemplary embodiment.
Figure 2:
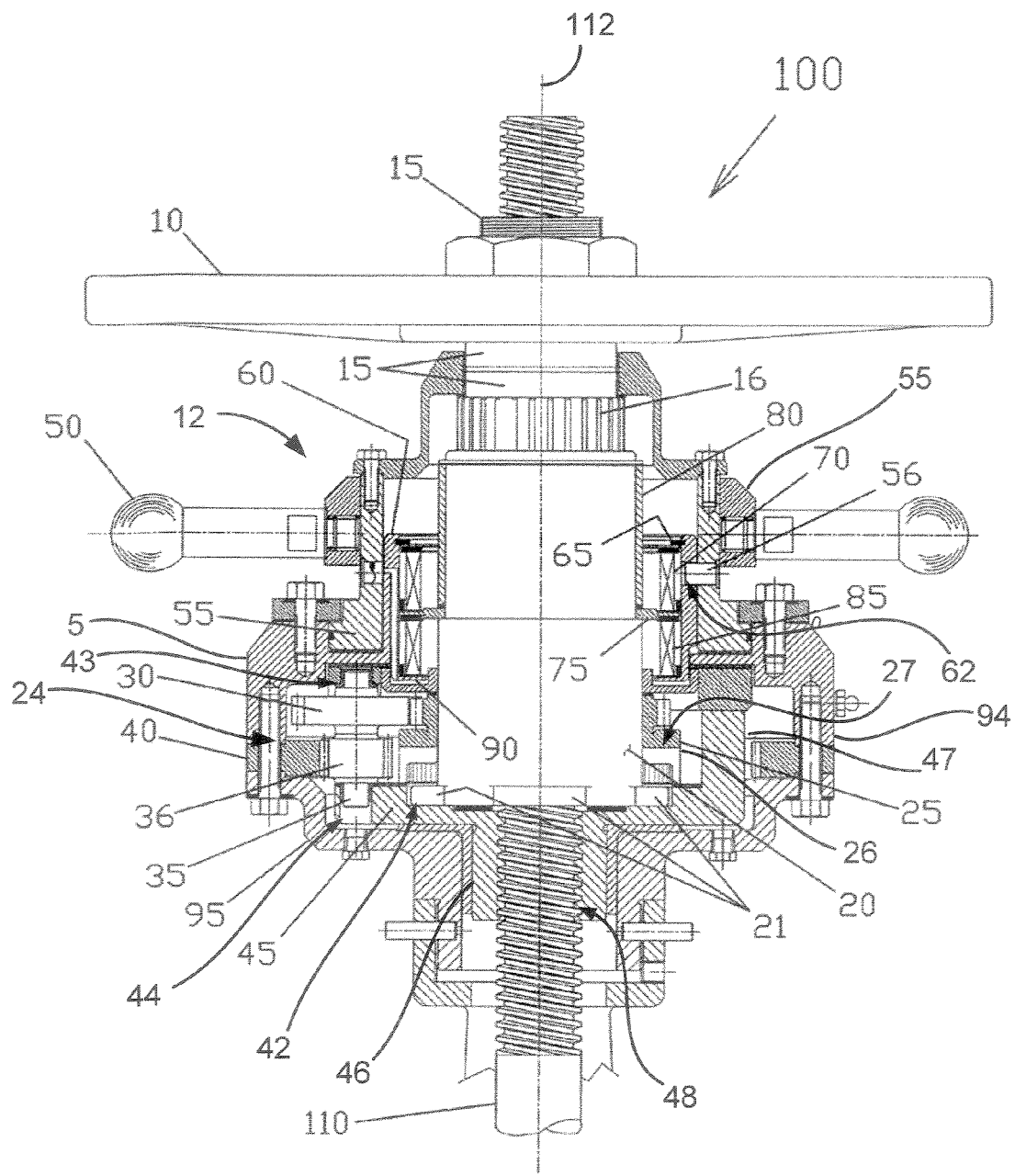
FIG. 2 illustrates a sectional view of the valve actuator in a second position in accordance with an exemplary embodiment.
Figure 3:
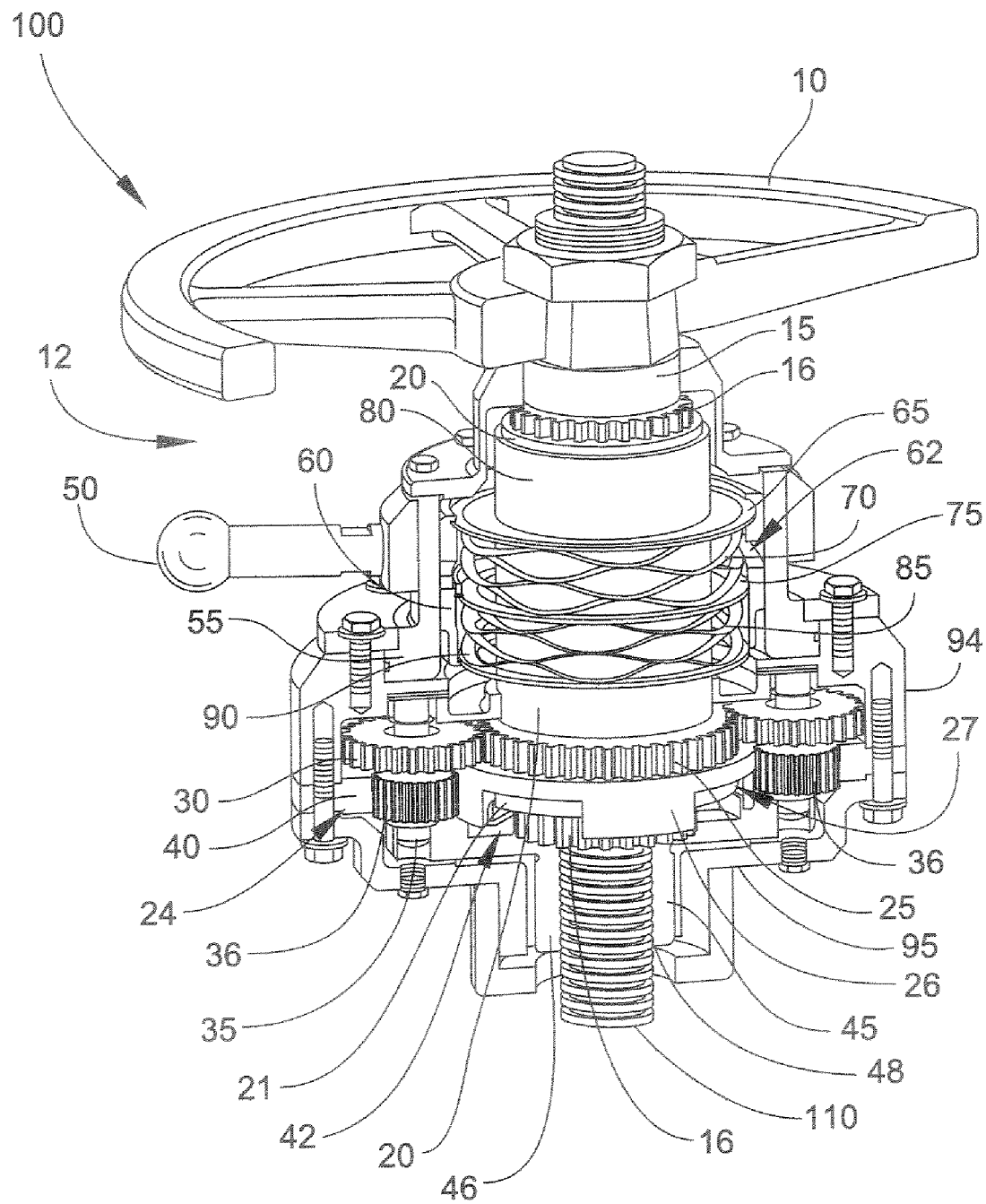
FIG. 3 illustrates a perspective view of the valve actuator in the first position in accordance with an exemplary embodiment.

To address the above and other problems, exemplary embodiments disclose a valve actuator capable of easily shifting between distinct gear ratios to support different torque demands. With reference to FIGS. 1-3, a valve actuator 100 may be configured for use in actuating a valve (not shown) via a valve stem 110. It will be understood by those of ordinary skill in the art that various valve types, including but not limited to ball valves and gate valves, may be opened or closed by the movement an actuation member such as the valve stem 110 along its longitudinal axis 112. The valve actuator 100 is configured to allow a human operator or a motor to impart a rotation force to the valve stem 110 using one of a plurality of selectable torque options.

The valve actuator 100 has a housing 5 that may be fixed in place relative to a valve (not shown) that may be opened or closed by the axial movement of the valve stem 111. A rotatable carrier 45 configured for receiving the valve stem 110 and causing the valve stem 110 to rotate when the carrier 45 is rotated is rotatably mounted within the housing. The carrier 45 is rotated by a collar 20 which, in turn, is rotated by a drive mechanism such as a handwheel 10 or motor. As will be discussed in more detail below, the valve actuator 100 may be configured so that the collar 20 can be moved along the longitudinal axis 112 between a first (high required torque) posit on in which the collar 20 drives the carrier 45 indirectly through a gear assembly 24 and a second (low required torque) position in which the collar 20 directly drives the carrier 45. Alternatively, the valve actuator 100 may be configured so that in the low required torque position the collar 20 drives the carrier 45 through a second gear assembly rather than through direct engagement. In either case, the collar 20 may be moved back and forth between the low and high required torque positions through the use of a hand-operated shifting mechanism 12 mounted on the housing 5. The valve actuator may also include a securing mechanism to prevent inadvertent shifting.

As used herein, the term "high required torque" refers to an operating scenario where a relatively high amount of force is required to move the valve disc (e.g., due to fluid pressure in the line). As used herein the term "low required torque" refers to an operating scenario where a relatively low amount of force is required to rove the valve disc (e.g., when the pressure on both sides of the valve disc is the same).

The components of the valve actuator 100 will now be discussed in more detail. The housing 5 has an upper body portion 55, central portion 94, and a lower or base portion 95. The carrier 45 is rotatably mounted within the central and base portions 94, 95 of the housing 5 so that it can be rotated about the longitudinal axis 112. The carrier 45 has a cylindrical lower portion 46 and a generally cylindrical, larger diameter upper portion 47. The lower carrier portion has a threaded passage 48 configured for receiving and engaging a threaded portion of the valve stem 110. The carrier 45 is restrained from vertical movement relative to the housing 5. As a result, when the threaded portion of the valve stem 110 is disposed with the threaded passage 48, rotation of the carrier 45 causes the valve stem 110 to move axially relative to the carrier 45 and the housing 5. Clockwise rotation of the carrier 45 causes axial motion in one direction (e.g. distally) while counterclockwise. rotation of the carrier 45 causes axial motion in the opposite direction (e.g., proximally).

As noted above, rotation of the carrier 45 is accomplished by using a drive mechanism 10 to rotate a collar 20, which directly or indirectly drives the rotation of the carrier 45. In the illustrated embodiment, the drive mechanism 10 is a handwheel attached to an annular, cylindrical operator 15 rotatably mounted to the housing 5. It will be understood that other drive mechanisms such as a motor can also be used. The cylindrical operator 15 has a bearing portion and a collar engagement portion. The collar engagement portion has a plurality of splines 16 extending radially outward from the outer surface of the operator. These splines 16 extend linearly along the operator surface parallel to the longitudinal axis 112.

The collar 20 has a main body formed as an annular cylinder rotatably disposed within the housing 5 and a rotation transmission portion in the form of radial lugs 21. The collar 20 has a full-length central passage sized to receive the collar engagement portion of the operator 15 therein. The inner surface of the central passage of the collar 20 is configured to be complementary to the splines 16 so that the collar 20 rotates in concert with the operator 15, but can slide axially along the splines 16. As discussed below, this allows the collar 20 to be selectively moved between a first axial position wherein the collar 20 engages a gear arrangement 24 having a central gear 25 and a second axial position wherein the collar 20 directly engages the carrier 45 (or engages a second gear arrangement). FIG. 1 illustrates the valve actuator 100 with the collar 20 in the first position and FIGS. 2 and 3 illustrate the valve actuator 100 with the collar 20 in the second position.

In the illustrated embodiment, the gear arrangement 24 is a planetary gear assembly wherein the central gear 25 is a sun gear that engages one or more planet gears 30. The sun gear 25 is rotatably mounted within the housing 5 so that it rotates about the longitudinal axis 112. A central opening in the sun gear 25 allows passage of the operator 15, the collar 20, and the valve stem 110 therethrough. The sun gear 25 has a cylindrical skirt 26 extending distally adjacent its outer circumference. The skirt 26 has a plurality of slots 27 formed therein. These slots 27 are configured or receiving a plurality of lugs 21 extending radially outward from the cylindrical surface of the collar 20 adjacent its distal end. The lugs 21 are received into the slots 27 when the collar 20 is in the first position as shown in FIG. 1. In this position, rotation of the collar 20 causes the sun gear 25 to rotate, thereby driving the planet gear(s) 30.

It will be understood that any number of planetary gears may be used without departing from the invention. Alternatively, other gear arrangements may be used.

Each planet gear 30 is attached to and rotates with a planet gear shaft 35. A smaller secondary planet gear 36 is also mounted to the gear shaft 35 so that it rotates with the gear shaft 35 and the planet gear 30. The small planet gear 36 meshes with a ring gear 40, which is fixedly attached to base portion 95 of the housing 5. Because the ring gear 40 is fixed in place, rotation of the one or more small planet gears 36 results in revolution of the planet gears 30, 36 around the longitudinal axis 112. In particular, this produces a circular motion of each planet gear shaft 35 around the longitudinal axis 112. This circular motion is then transferred to the carrier 45. As shown in FIGS. 1 and 2, one end of the planet gear shaft 35 may be configured to extend proximally beyond the planet gear 30 into a first cylindrical shaft passage 43 formed in the upper portion 47 of the carrier 45. The other end of the planet gear shaft 35 may be configured to extend distally beyond the smaller planet gear 36 into a second cylindrical shaft passage 44 formed in the upper portion 47 of the carrier 45. The first and second passages 43, 44 are configured to allow rotation of the shaft ends.

It can thus be seen that the circular motion of the planet gear shaft 35 forces the carrier 45 to rotate about the longitudinal axis. It can also be seen that, by virtue of the difference in planet gear diameters, the rotation rate of the carrier 45 will be lower than the rotation rate of the operator 15, collar 20 and sun gear 5.

As discussed above, the collar 20 may be shifted between the first position in which the collar 20 is in engagement with the gear arrangement 24 and the second position in which the collar 20 may engage the carrier 45 directly. Direct engagement of the collar 20 and the carrier 45 may be accomplished by providing the inner surface of the upper portion 47 of the carrier 45 with carrier slots 42 configured to receive the collar lugs 21 as shown in FIG. 2. When the lugs 21 are received into ache slots 42, the carrier 45 is forced to rotate with the collar 20 at the same rate. This corresponds to a one-to-one torque ratio. In other words, the collar 20 is positioned so that the torque applied to the valve stem 110 (to open or close the valve) is the sane as the input torque applied by the drive mechanism 10 less efficiency losses. In alternate embodiments multiple gear assembles can be provided to obtain different gear ratios.

The collar 20 can be moved between the first and second positions using a shifting mechanism 12. As shown in FIGS. 1-3, the shifting mechanism 12 may include a cam arrangement that converts rotational motion of a cam lever 50 (selector) into translational motion of a cam housing 60. Using a pair of springs 70 and 85, the collar 20 can be biased toward the first or second collar position depending on the translational position of the cam housing.

The cam lever 50 is mounted on the upper body 55 of the housing, which surrounds the cam housing 60. The upper body 55 is mounted so that it can be rotated around the longitudinal axis 112 using the cam lever 50. The cam housing 60 is mounted within the housing 5 so that it can move axially but cannot rotate. One or more slots 62 are formed in and around the circumference of the cam housing 60 in a spiral configuration. Each slot 62 is configured to receive a corresponding cam pin 56 attached to the upper body 55. As the cam lever 50 and upper body 55 rotate, the cam pints) 6 slide along the one or more slots formed in cam housing 60. The one or more spiral slots 62 are angled such that the rotation of the upper body 55 causes the pints) 56 to force the cam housing 60 to move axially within the housing 5. The slot angle determines the amount of axial translation of the cam housing 60 relative to the rotation of the upper body 55. The greater the slot angle, the greater the translation of the cam housing 60 for a given amount of rotation of the upper body 55. In exemplary embodiments, the slot angle is in a range of 25 to 35 degrees and in a particular embodiment, the slot angle may be 30 degrees.

A recess is formed at the top of the cam housing 60 for receiving a top spring retainer ring 65, which travels up and down in concert with the cam housing 60. The top spring retainer ring 65 can be formed of multiple components and is positioned above an upper or top spring 70. The top spring 70 is trapped between the top spring retainer ring 65 and a spring divider ring 75. The spring divider ring 75 is a circular flange secured to the collar 20 by a retaining cylinder 80. A lower or bottom spring 85 is trapped between the spring divider ring 75 and a cam housing shelf 90 formed in the lower portion of the cam housing 60. When the cam lever 50 is rotated so as to axially move the cam housing 60, the top spring retainer ring 65 and the cam housing shelf 90 move with it. Movement in the distal direction results in a compressive force being applied to the top spring 70, which in turn asserts force upon the spring divider ring 75. This results in a distal biasing force being applied to the collar 20, which will cause the collar 20 to move from the first (high required torque position) to the second (low required torque) position when the carrier slots 42 align with the collar lugs 21. When the collar 20 is moved into the second position such that collar lugs 21 are forced into the carrier slots 42, the actuator 100 is configured for high-speed and low required torque valve actuation. The collar 20 is forced into and held in this position by the compressive force of the top spring 70

With the collar 20 in the second position as shown in FIG. 2, rotation of the cam lever 50 in the opposite direction causes the cam housing 60 to move proximally along with the top spring retainer ring 65 and the cam housing shelf 90. This applies a compressive force to the bottom spring 85. Because the spring divider ring 75 is secured to the collar 20, the bottom spring 85 applies a proximal biasing force to the spring divider ring 75 and, thus, the collar 20. This will cause the collar 20 to move from its second position to its first position when the sun gear slots 27 align with the collar lugs 21. Collar 20 is held in this position by the force of bottom spring 85. We the collar 20 is forced to move into its first position such that the collar lugs 21 are received into the sun gear slots 27, the actuator 100 is configured for low-speed and high required torque valve actuation.

It will be understood that the top and bottom springs 70, 85 aid in collar 20 alignment and engagement. Wen the cam lever 50 is rotated, the collar 20 moves up or down depending on the direction of rotation. In some situations, the collar lugs 21 may not line up precisely with the carrier slots 42 or sun gear slots 27. When in compression, the top spring 70 or bottom spring 85 presses the collar lugs 21 against the carrier 45 or sun gear 25, respectively. The collar lugs then, can automatically snap into position with slight movement of actuator 100, such as by, for example, slightly rotating the handwheel 10. In exemplary embodiments the collar lugs 21 can be formed in a manner that facilitates positioning. For example, the collar lugs 21 and the mating slots of carrier 45 and sun gear 25 can be tapered or formed in the shape of teeth having sloped sides. Other embodiments may have the collar lugs 21 and the rating slots of the carrier 45 and the sun gear 25 formed with round or curved edges.

The spring divider ring 75 can be secured to the collar 20 by the retaining cylinder 80. In one exemplary implementation, collar 20 is formed having multiple (step) diameters such that spring divider ring 75 and retaining cylinder 80 can slide over a small diameter section of collar 20 until restrained by a large diameter section which forms a shelf or edge upon which the spring divider ring 75 can rest. The collar 10 can be formed with a recess such that a retaining ring can be applied to secure the retaining cylinder 80 in position.

In an exemplary implementation, the top spring 70 and bottom spring 85 are positioned such that during movement of the cam housing 60, when one spring is in compression, the other spring is relaxed. Thus, when the cam housing 60 is moving proximally the bottom spring 85 is compressed and the top spring 70 is relaxed. Conversely, when the cam housing 60 is moving distally, the top spring 70 is in compression, the bottom spring 85 is relaxed. In this manner, the retaining for an of the top spring 70 and the bottom spring 85 will not oppose one another by an opposite counter force.

The shifting mechanism 12 may include a cam lever securing mechanism that assists in maintaining the cam lever 50 in a selected position and, thereby, maintaining the collar 20 in its corresponding position. The cam lever securing mechanism may include notches or detents formed in the cam slots 62. These may positioned to provide resistance to movement of the pins) 56, and thus the cam housing 60, away from the first position when in the first position and away from the second position when in the second position. Alternatively or in addition, the pin 56 may be formed with a detent positioned for receipt into one or more notches or depressions in the cam slot 62.

The cam lever 50 and upper body 55 form a balanced assembly, which, in conjunction with the securing mechanism, serve to prevent the shifting mechanism 12 from shifting gear ratios inadvertently due to, for example, shock or vibration loads conducted through the valve to the actuator 100.

FIGS. 1 and 2 illustrate an exemplary embodiment having two gear ratios: 1:1 and X:1, where the X is a function of the pitch diameters of the gears. In alternate embodiments, additional gear assemblies may be used, each of which provides a different gear ratio. In such embodiments, the cam lever 50 can be manipulated to cause the collar 20 engage any of various gear assemblies each having differing pitch diameters so as to produce a different gear ratio.

As noted above, the drive mechanism may include a motor in lieu of or in addition to a handwheel to drive a valve. Valve stem 110 can be operated via power derived from an electric motor. By using a varying ear ratio, the valve stem 110 has an opportunity to move quickly before the full load of the valve is placed upon it. Further, different gear ratios can be presented to the motor depending on the torque requirement in order to conserve energy and motor wear. In another exemplary embodiment power can be provided from a pneumatic power source. Such drive and shift mechanisms are within the capability of one of ordinary skill in the art to implement.

While the present invention has been particularly shown and described with reference to certain exemplary embodiments thereof, it will be understood by those of ordinary skill in the art that various changes in form and detail may be made therein without departing from the spirit and scope of the present invention as defined by the appended claims and equivalents thereof. Further, the arrangement of gear teeth and relative gear size shown in the drawings is to be understood as purely exemplary.

What is claimed is:

1. An actuator for moving a threaded valve stem along a longitudinal axis to selectively open or close a valve positioned at a distal end of the valve stem, the actuator comprising:
    a housing;
    a carrier rotatably mounted within the housing for rotation of the carrier about the longitudinal axis, the carrier having
        a stem engagement portion having a bore formed therein, the bore being threaded to engage and receive the threaded valve stem therethrough,
        a first collar engagement portion, and
        a gear engagement portion;
    a gear arrangement comprising a central gear rotatably mounted within the housing for rotation about the longitudinal axis and having a second collar engagement portion, the gear arrangement engaging the gear engagement portion of the carrier for transmitting a rotational force from the central gear to the carrier;
    a cylindrical operator rotatable mounted to the housing for rotation about the longitudinal axis, the operator having a plurality of longitudinally oriented splines on at least a portion of a circumferential surface thereof, the operator being configured for receiving a rotational input force from a drive mechanism; and
    an annular collar slidably disposed around the operator, the collar having a cylindrical body with proximal and distal ends, a through bore having a bore surface configured to engage the splines so that the collar must rotate with the operator but can slide longitudinally along the operator between at least a first longitudinal position and a second longitudinal position, and a rotation transmission portion configured for engaging the second collar engagement portion to allow transmission of a rotational force to the central gear when the collar is in its first longitudinal position and for engaging the first collar engagement portion to allow transmission of a rotational force to the carrier when the collar is in its second longitudinal position.

2. An actuator according to claim 1 wherein
    the first collar engagement portion has a first plurality of lug engagement slots formed in a proximal surface thereof,
    the second collar engagement portion has a second plurality of lug engagement slots formed in a distal surface thereof, and
    the rotation transmission portion of the collar comprises a plurality of lugs extending radially outward from the cylindrical body adjacent its distal end, the lugs being configured for reception in and engagement with the second plurality of lug engagement slots when the collar is in its first longitudinal position and engagement with the first plurality of lug engagement slots when the collar is in its second longitudinal position.

3. An actuator according to claim 1 wherein the gear arrangement comprises a planetary gear assembly having at least one planet gear set with a primary planet gear and a secondary planet gear attached to a common planet shaft, the primary planet gear engaging the central gear and the secondary gear engaging a fixed ring gear, and wherein the planet shaft engages the gear engagement portion of the carrier.

4. An actuator according to claim further comprising:
    means for selectively moving the collar between the first position and the second position.

5. An actuator according to claim 4 further comprising:
    securing means for resisting movement of the collar when the collar is in the first or second position.

6. An actuator according to claim 1 further comprising:
    a shifting mechanism comprising
        a lever configured for selectively rotating a cylindrical portion of the housing about the longitudinal axis between at least a first rotational position and a second rotational position;
        a first annular spring positioned around a distal portion of the collar and configured to selectively bias the collar toward the first longitudinal position when the cam lever is in the first rotational position,
        a second annular spring positioned around a proximal portion of the collar and configured to selectively bias the collar toward the second longitudinal position when the cam lever is in the second rotational position, and
        a spring divider ring coupled to the collar and positioned intermediate the first and second annular springs.

7. An actuator according to claim 6 wherein the shifting mechanism further comprises
    an annular cam housing surrounding the first and second annular springs, the cam housing having distal and proximal cam housing ends, being longitudinally movable between a first cam position and a second cam housing position, and having a cam slot formed on a cylindrical exterior surface thereof, the cam slot being arranged in a circumferential spiral around a portion of the cylindrical exterior surface,
    and at least one cam pin attached to an interior surface of the cylindrical housing portion and extending radially inward toward the longitudinal axis, a free end of the can pin being received into the cam slot so that rotation of the cylindrical housing portion causes the cam pin to move along the cam slot, thereby forcing the cam housing to move in a longitudinal direction.

8. An actuator according to claim 7 wherein the shifting mechanism further comprises a top spring retainer ring attached to an inner surface of the cam housing at or adjacent the proximal cam housing end and a bottom spring retainer ring attached to the inner surface of the cam housing at or adjacent the distal cam housing end, the top and bottom spring retainer rings being configured for engaging the second and first annular springs, respectively.

9. An actuator according to claim 7 further comprising:
a cam lever securing mechanism comprising, in the cam slot, at least one of the set consisting of a notch and a detent configured for resisting movement of the collar when the collar is in one of the first and second positions.

10. An actuator for moving a threaded valve stem along a longitudinal axis to selectively open or close a valve positioned at a distal end of the valve stem, the actuator comprising:
a housing;
a carrier rotatably mounted within the housing for rotation of the carrier about the longitudinal axis, the carrier having a stem engagement potion having a bore formed therein, the bore being threaded to engage and receive the threaded valve stem therethrough;
a first gear arrangement comprising a central gear rotatably mounted within the housing for rotation about the longitudinal axis, the first gear arrangement having meals for transmitting a rotational force from the central gear to the carrier;
a cylindrical operator rotatably mounted to the housing for rotation about the longitudinal axis, the operator having a plurality of elongate, longitudinally oriented splines on at least a portion of a circumferential surface thereof, the operator being configured for receiving a rotational input force from a drive mechanism; and
an annular collar slidably disposed around the operator, the collar having a cylindrical body with proximal and distal ends, a through bore having a bore surface configured to engage the splines so that the collar must rotate with the operator but can slide longitudinally along the operator between at least a first longitudinal position and a second longitudinal position, and means for engaging the central gear to allow transmission of a rotational force to the central gear when the collar is in its first longitudinal position and for disengaging the central gear when the collar is in its second longitudinal position.

11. An actuator according to claim 10 wherein the first gear arrangement comprises a planetary gear assembly having at least one planet gear set with a primary planet gear and a secondary planet gear attached to a common planet shaft the primary planet gear engaging the central gear and the secondary gear engaging a fixed ring gear, and wherein the planet shaft engages the carrier.

12. An actuator according to claim 11 further comprising: means for selectively moving the collar between the first position and the second position.

13. An actuator according to claim 12 wherein the means for selectively moving the collar includes first spring means for selectively biasing the collar toward the first position and second spring means for selectively biasing the collar toward the second position.

14. An actuator according to claim 12 wherein the means for selectively moving the collar includes
a lever configured for selectively rotating a cylindrical portion of the housing about the longitudinal axis between at least a first rotational position and a second rotational position;
a first annular spring positioned around a distal portion of the collar and configured to selectively bias the collar toward the first longitudinal position when the cam lever in the first rotational position,
a second annular spring positioned around a proximal portion of the collar and configured to selectively bias the collar toward the second longitudinal position when the cam lever is in the second rotational position, and
a spring divider ring coupled to the collar and positioned intermediate the first and second annular springs.

15. An actuator according to claim 14 wherein the shifting mechanism further comprises
an annular cam housing surrounding the first and second annular springs, the cam housing having distal and proximal cam housing ends, being longitudinally movable between a first cam position and a second cam housing position, and having a cam slot formed on a cylindrical exterior surface thereof, the cam slot being arranged in a circumferential spiral around a portion of the cylindrical exterior surface,
and at least one cam pin attached to an interior surface of the cylindrical housing portion and extending radially inward toward the longitudinal axis, a free end of the cam pin being received into the cam slot so that rotation of the cylindrical housing portion causes the cam pin to move along the cam slot, thereby forcing the cam housing to move in a longitudinal direction.

16. An actuator according to claim 15 wherein the shifting mechanism further comprises a top spring retainer ring attached to an inner surface of the cam housing at or adjacent the proximal cam housing end and a bottom spring retainer ring attached to the inner surface of the cam housing at or adjacent the distal cam housing end, the top and bottom spring retainer rings being configured for engaging the first and second annular springs, respectively.

17. An actuator according to claim 10 wherein the collar further includes means for engaging the carrier to allow transmission of a rotational force to the carrier when the collar is in its second longitudinal position and for disengaging the carrier when the collar is in its first longitudinal position.

18. An actuator according to claim 10 further comprising:
a second gear arrangement comprising a second central gear rotatably mounted within the housing for rotation about the longitudinal axis, the second gear arrangement having second means for transmitting a rotational force from the central gear to the carrier and having a different gear ratio than the first gear arrangement.

19. An actuator according to claim 18 wherein the collar further includes means for engaging the second central gear to allow transmission of a rotational force to the carrier when the collar is in its second longitudinal position and for disengaging the second central gear when the collar is in its first longitudinal position.

* * * * *